US009235875B2

United States Patent
Ioffe et al.

(10) Patent No.: US 9,235,875 B2
(45) Date of Patent: Jan. 12, 2016

(54) IMAGE ENHANCEMENT USING LEARNED NON-PHOTOREALISTIC EFFECTS

(71) Applicants: Sergey Ioffe, Mountain View, CA (US); Hui Fang, Mountain View, CA (US)

(72) Inventors: Sergey Ioffe, Mountain View, CA (US); Hui Fang, Mountain View, CA (US)

(73) Assignee: Google Inc., Mountain View, CA (US)

( * ) Notice: Subject to any disclaimer, the term of this patent is extended or adjusted under 35 U.S.C. 154(b) by 83 days.

(21) Appl. No.: 13/666,928

(22) Filed: Nov. 1, 2012

(65) Prior Publication Data

US 2014/0119672 A1 May 1, 2014

(51) Int. Cl.
*G06T 5/00* (2006.01)
*G06K 9/40* (2006.01)
*G06T 15/02* (2011.01)

(52) U.S. Cl.
CPC . *G06T 5/001* (2013.01); *G06K 9/40* (2013.01); *G06T 15/02* (2013.01)

(58) Field of Classification Search
CPC .... G06K 9/40; G06F 17/30861; G06T 5/001; G06T 15/02
USPC .................................. 382/224, 260; 707/737
See application file for complete search history.

(56) References Cited

U.S. PATENT DOCUMENTS

| | | | |
|---|---|---|---|
| 6,970,194 B1 * | 11/2005 | Smith | 348/247 |
| 8,379,937 B1 * | 2/2013 | Moon et al. | 382/118 |
| 2003/0026495 A1 | 2/2003 | Gondek | |
| 2005/0243355 A1 * | 11/2005 | Foehr et al. | 358/1.13 |
| 2006/0182364 A1 | 8/2006 | John | |
| 2007/0110303 A1 * | 5/2007 | Bhattacharjya et al. | 382/166 |
| 2007/0172140 A1 * | 7/2007 | Kokemohr | 382/261 |
| 2008/0134094 A1 * | 6/2008 | Samadani et al. | 715/838 |
| 2008/0159645 A1 * | 7/2008 | Kempf et al. | 382/264 |

(Continued)

FOREIGN PATENT DOCUMENTS

EP 2077442 A1 7/2009

OTHER PUBLICATIONS

Inoue et al. ("Anisotropic shock filter for enhancement and non-photorealistic generation of flow patterns," The 2004 47th Midwest Symposium on Circuits and Systems, vol. 1, Jul. 25-28, 2004).*

(Continued)

*Primary Examiner* — Yubin Hung

(57) ABSTRACT

Systems, methods and computer readable media for image enhancement using learned non-photorealistic effects. In some implementations, a method can include obtaining an original image. The method can also include analyzing the original image to determine one or more characteristics of the original image. The method can further include selecting one or more filters based on the one or more characteristics and applying the one or more filters to the original image to generate a modified image. The method can include causing the modified image to be displayed.

20 Claims, 4 Drawing Sheets

(56) References Cited

U.S. PATENT DOCUMENTS

| | | | |
|---|---|---|---|
| 2010/0005105 A1* | 1/2010 | Zhang et al. | 707/100 |
| 2010/0045870 A1* | 2/2010 | Chao | 348/607 |
| 2010/0086215 A1 | 4/2010 | Bartlett et al. | |
| 2010/0183217 A1 | 7/2010 | Seung et al. | |
| 2010/0278267 A1* | 11/2010 | Lai et al. | 375/240.16 |
| 2011/0007973 A1* | 1/2011 | Kwon et al. | 382/199 |
| 2011/0010364 A1* | 1/2011 | Ahtisaari et al. | 707/724 |
| 2011/0280447 A1* | 11/2011 | Conwell | 382/103 |
| 2012/0038797 A1* | 2/2012 | Jang et al. | 348/241 |
| 2012/0155759 A1* | 6/2012 | Kang et al. | 382/167 |
| 2012/0269441 A1* | 10/2012 | Marchesotti et al. | 382/195 |
| 2013/0235070 A1* | 9/2013 | Webb | 345/594 |
| 2014/0067679 A1* | 3/2014 | O'Reilly et al. | 705/44 |

OTHER PUBLICATIONS

ISR and Written Opinion mailed Jan. 29, 2014 in corresponding PCT/US2013/067896.

Stephen Brooks, "Mixed Media Painting and Portraiture", IEEE Transactions on Visualization and Computer Graphics, vol. 13, No. 5, pp. 1041-1054, Sep./Oct. 2007.

Hertzmann A et al, "Image Analogies", Computer Graphics, Siggraph 2001, Conference Proceedings, Aug. 2001, pp. 327-340.

* cited by examiner

IMAGE ENHANCEMENT USING LEARNED NON-PHOTOREALISTIC EFFECTS

BACKGROUND

Digital images, such as photographs, may have certain characteristics that can be corrected using a photorealistic filter. However, a photorealistic filter may create artifacts when applied to an image. Also, users may have difficulty determining which filter type(s) to apply to a given image in order to achieve a desirable result.

SUMMARY

Some implementations relate generally to image processing, and, more particularly, to image enhancement using learned non-photorealistic effects.

Some implementations can include a method comprising obtaining an original image and analyzing the original image to determine one or more characteristics of the original image. The method can also include selecting a first filter based on the one or more characteristics and a second filter based on the first filter. The first filter can include a photorealistic filter selected to correct an aspect of the original image and the second filter can include a non-photorealistic filter selected to reduce any artifacts created by the photorealistic filter.

The method can also include applying the first filter to the original image to generate a first modified image and then applying the second filter to the first modified image to generate a second modified image. The method can further include causing the second modified image to be displayed.

Some implementations can include a method comprising obtaining an original image and analyzing the original image to determine one or more characteristics of the original image. The method can also include selecting a first filter based on the one or more characteristics and a second filter based on the first filter. The method can further include applying the first filter and the second filter to generate a modified image and causing the modified image to be displayed.

The first filter can include a photorealistic filter selected to correct the original image and the second filter includes a non-photorealistic filter selected to reduce any artifacts created by the photorealistic filter, and the applying can include applying the photorealistic filter followed by the non-photorealistic filter.

The selecting can be performed by a classifier. The method can also include training the classifier based on training data. The method can further include training the classifier by learning filters preferred by one or more users. The method can also include training the classifier using a positive training data set and a negative training data set.

The method can further include presenting a plurality of groups of one or more filters, where the groups are ordered for presentation based on a score from a classifier. The method can also include suggesting one or more filters at a time the original image is obtained by an imaging device. The one or more filters can be selected for suggestion based on a classifier score of the original image.

The classifier can be trained based on information obtained from a social graph. The classifier can be trained based on filters suggested to a user by other users within a social graph of the user. The classifier can also be trained based on training data selected from images associated with a social graph.

Some implementations can include a system having one or more computers configured to perform operations. The operations can include obtaining an original image and analyzing the original image to determine one or more characteristics of the original image. The operations can also include selecting a first filter based on the one or more characteristics and a second filter based on the first filter. The operations can further include applying the first filter and the second filter to generate a modified image and causing the modified image to be displayed.

The first filter can include a photorealistic filter selected to correct the original image and the second filter can include a non-photorealistic filter selected to reduce any artifacts created by the photorealistic filter. The applying can include applying the photorealistic filter followed by the non-photorealistic filter. The selecting can be performed by a classifier.

The operations can also include training the classifier based on training data. The operations can further include training the classifier by learning filters preferred by one or more users. The operations can also include presenting a plurality of groups of one or more filters, where the groups are ordered for presentation based on a score from a classifier.

The operations can also include suggesting one or more filters at a time the original image is obtained by an imaging device. The one or more filters can be selected for suggestion based on a classifier score of the original image. In some implementations, the classifier can be trained based on information obtained from a social graph.

These and other features may provide one or more of the following advantages. Some implementations can include first applying a photorealistic filter followed by a non-photorealistic filter, which can reduce artifacts that may be produced by the photorealistic filter, so that an image can be generated that may be more aesthetically pleasing to a user. By automatically selecting a photorealistic filter and a non-photorealistic, some implementations can help reduce the burden of selecting appropriate filters for a given image. In some implementations, the selection of the filters can be based on output from a classifier that has determined through machine learning which filters may be desirable to apply to a given image, this feature can give the benefit of an adaptive learning system that can tailor filter selection based on learned information to provide improved user satisfaction with filter selection and an image resulting from application of the selected filters.

DETAILED DESCRIPTION

In general, some implementations can include a method for image enhancement using learned non-photorealistic effects. Some implementations can include a method for automatically selecting and/or recommending one or more image filters to apply to an image. The method can include selecting and applying a photorealistic filter to correct a defect in an original image and then selecting and applying a non-photorealistic filter to hide any artifacts produced by the photo realistic filter. Photorealistic filters can include sharpening, noise reduction and the like designed to maintain photorealism of an image. Non-photorealistic filters can include expressive filters such as those based on artistic styles including painting, drawing and the like.

In some implementations, the photorealistic effect can be selected based on image features (e.g., noise) and then the non-photorealistic effect can be selected based on the selected photorealistic effect.

In some implementations, the selecting is performed by a classifier. The method can include training the classifier based on training data. The method can also include training the classifier by learning filters preferred by one or more users. The method can further include training the classifier using a positive training data set and a negative training data set.

Some implementations can include recommending filters to a user by presenting a plurality of groups of one or more filters for display, where the groups are ordered for display based on a score from the classifier. The method can also include suggesting one or more filters at a time the original image is obtained by an imaging device and prior to storing the original image.

Some implementations can include using information obtained from a social network (e.g., the social graph associated with a user). For example, the method can include training the classifier based on information obtained from a social graph or based on filters suggested to a user by other users connected to the user via a social graph. The method can also include training the classifier based on training data selected from images associated with a social graph.

Figure 1:
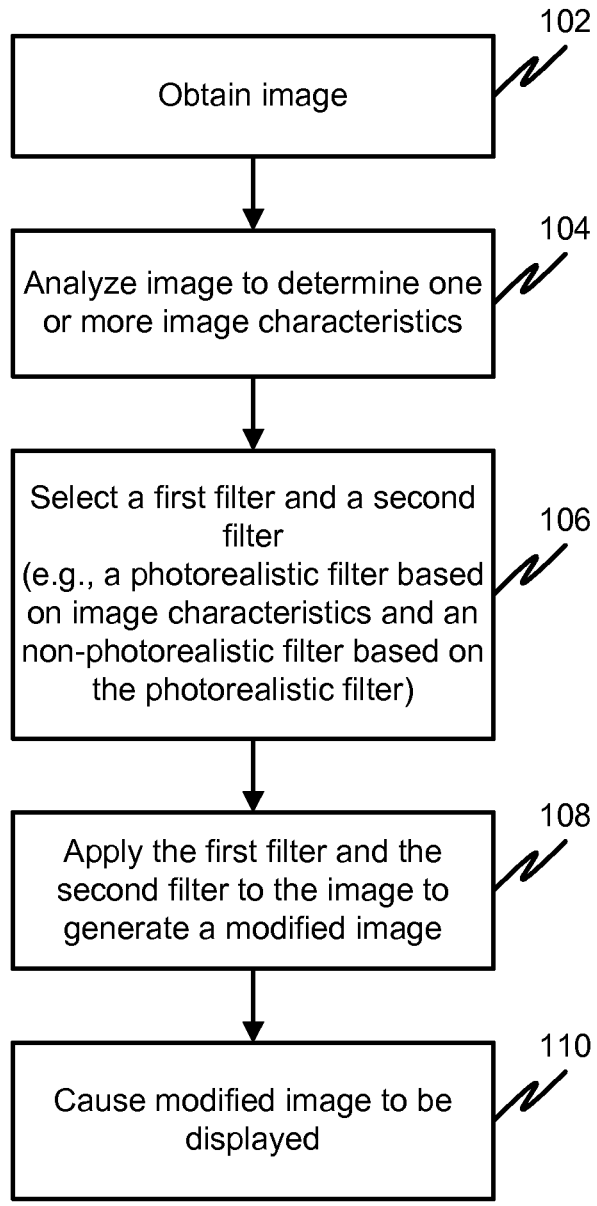
FIG. 1 is a flow chart of an example method of image enhancement using learned non-photorealistic effects in accordance with some implementations.

As shown in FIG. 1, processing for an example method of image enhancement using learned non-photorealistic effects 100 begins at 102 where an image is obtained. The image can be obtained from an imaging device (e.g., a camera in a wireless device such as a digital camera, smartphone or tablet device) or received from another system. Processing continues to 104.

At 104, the image is analyzed to determine one or more characteristics of the image. For example, the image can be analyzed by a processing device (e.g., 200 shown in FIG. 2) to determine characteristics such as one or more subjects of the image (e.g., plants, people, animals buildings, events or the like), histogram (e.g., of colors, intensities or the like), noise, focus, or any other characteristics of the image that may be useful for determining a filter type to apply. Processing continues to 106.

At 106, one or more filters are selected based, at least in part, on the image characteristics determined at 104. For example, a first filter (e.g., a photorealistic filter) can be selected based on the image characteristics and a second filter (e.g., a non-photorealistic filter) can be selected based on the first filter. Filters can be selected according to a score generated by a classifier (discussed in greater detail below in relation to FIG. 3), where the score is based on the image characteristics (or first filter selected) and learned data about each filter (e.g., for what types of image characteristics each filter may be desirable). For example, if an image is determined to be a picture of a forest, the filters chosen can be selected to make the greens in the trees greener.

The filters can be automatically selected to make specific changes to an image. For example, a first filter can be selected to make corrections to an original image, to make the original image look "better" in some respect, a filter can be selected to provide a non-photorealistic effect that is liked by users (e.g., is aesthetically pleasing), and/or a filter can be selected to reduce the visibility the effects of a filter (e.g., hide artifacts).

In addition to selecting one or more filter(s), the system can automatically select a weight to apply to each filter based on learned data, where the weight determines a level at which the filter is applied. Processing continues to 108.

At 108, the first filter and the second filter are applied. For example, the first filter can be applied by the processing device (or system) (e.g., 200) to the original image to generate an intermediate (or first) modified image. Then, the second filter can be applied to the intermediate modified image to generate a final (or second) modified image. It will be appreciated that the second filter can be selected based on the first filter, one or more characteristics of the original image and/or one or more characteristics of the intermediate modified image. Processing continues to 110.

At 110, the modified image is caused to be displayed. For example, the processing system 200 can send the modified image to a user device. It will be appreciated that 102-110 can be repeated in whole or in part in order to accomplish a contemplated image enhancement task using learned non-photorealistic effects.

Figure 2:
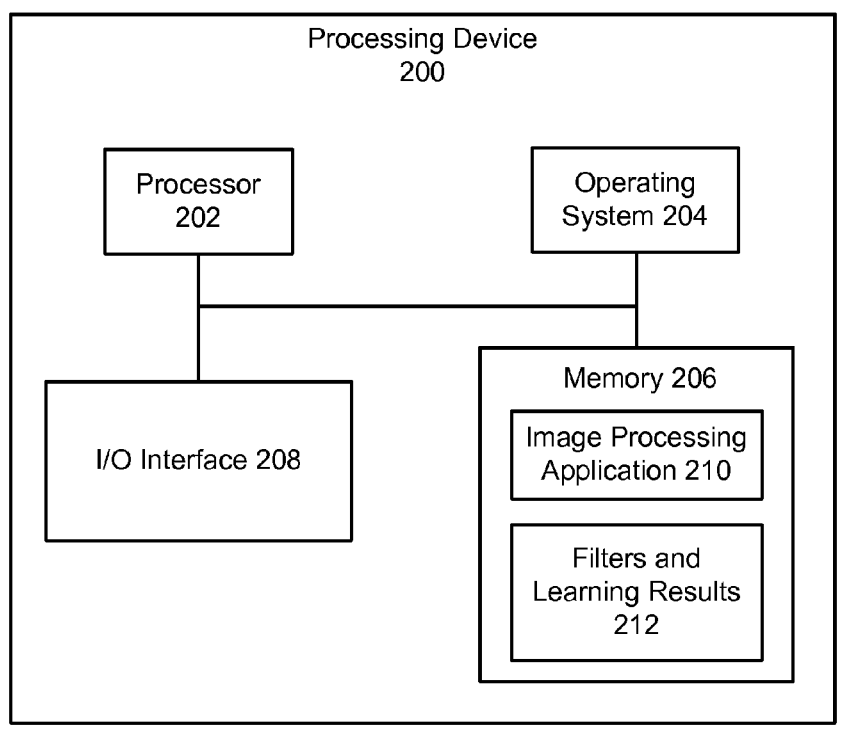
FIG. 2 is a diagram of an example system in accordance with some implementations.

FIG. 2 is a diagram of an example processing device 200 that can be used for image enhancement using learned non-photorealistic effects in accordance with some implementations. The server device 200 includes a processor 202, operating system 204, memory 206 and I/O interface 208. The memory 206 can include a notification application 210 and one or more notification state information objects 212.

In operation, the processor 202 may execute the image processing application 210 stored in the memory 206. The image processing application 210 can include software instructions that, when executed by the processor, cause the processor to perform operations for image enhancement using learned non-photorealistic effects (e.g., the image processing application 210 can perform one or more of steps 102-110 described above and, in conjunction, can access the filters and learning result(s) 212). The image processing application 210 can also operate in conjunction with the operating system 204.

Figure 3:
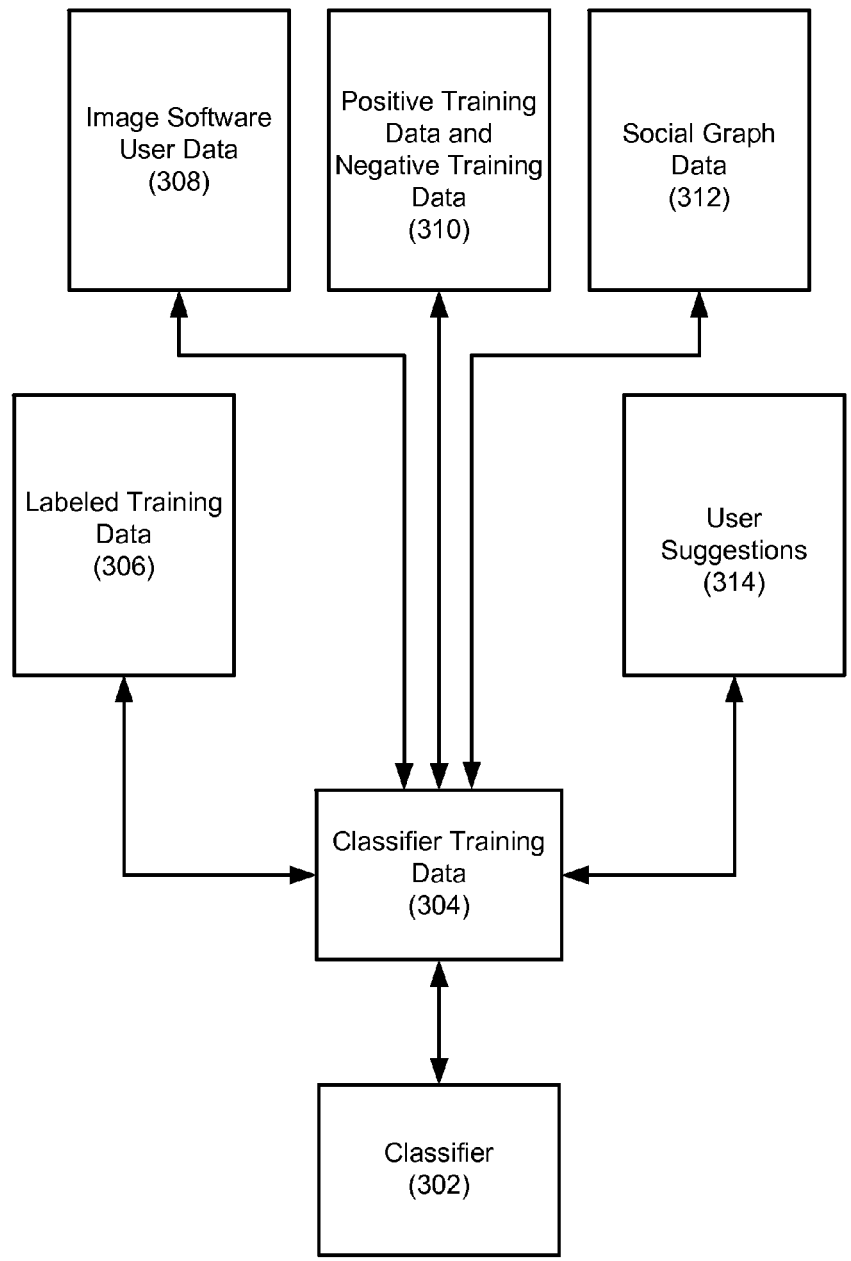
FIG. 3 is a diagram of an example classifier training system in accordance with some implementations.

FIG. 3 is a diagram of an example classifier training system in accordance with some implementations. The system can include a classifier (or ranker) 302 coupled to a source of classifier training data 304. The classifier 302 is configured to identify which of a set of categories (e.g., desirable filters) a new observation (e.g., an image) belongs, on the basis of a training set (e.g., 304) of data containing observations (or instances) whose category membership is known. The classifier 302 can determine a score for each set of one or more filters in relation to an input image. The score can be based on one or more criteria such as how a photorealistic filter can correct a characteristic of an image and how a non-photorealistic filter can make any artifacts of the photorealistic filter less visible and/or make the image look more appealing to a user in some respect.

The training data can include one or more sources including, but not limited to, labeled training data 306 (e.g., a set of image characteristics and corresponding filters), image software user data 308 (e.g., gathering which filters users have applied to which types of images within an image software application such as a photo or image editor, and can also include identifying which filters user applied and subsequently unapplied to an image), positive training data and negative training data 310 (e.g., filters users historically like and filters users historically do not like), social graph data 312 (described in greater detail below), and/or user suggestions 314.

The classifier 302 can be trained using any known or later developed machine learning technique including, but not limited to, support vector machines (SVM), decision tree learning, association rule learning, artificial neural networks, genetic programming, inductive logic programming, clustering, Bayesian networks, reinforcement learning, representation learning and/or the like.

Training data can be obtained from members (or users) of a social network. For example, training data corresponding to images sent between a first social network member and one or more other members in the social graph of the first social network member (or to users outside of the social network) can be analyzed and used as training data (e.g., for the system to learn preferences of the user and/or the social network of the user).

In some implementations, a plurality of filter groups can be selected and a modified image generated by each of the filter groups can be presented as suggestions to a user. These suggestions can be sorted by a classifier score associated with each filter group. In addition to, or as an alternative to, presenting suggestions, one or more filters can be automatically selected and applied without input from the user.

In some implementations, training data can be gleaned from a social graph in a variety of ways including, but not limited to analyzing images that a user votes for, recommends, posts or reposts, and analyzing what a user chares with the user's social graph. Also, social network members in a user's social graph could make suggestions regarding filters to apply to certain types of images (e.g., by recommendation, voting or the like).

Figure 4:
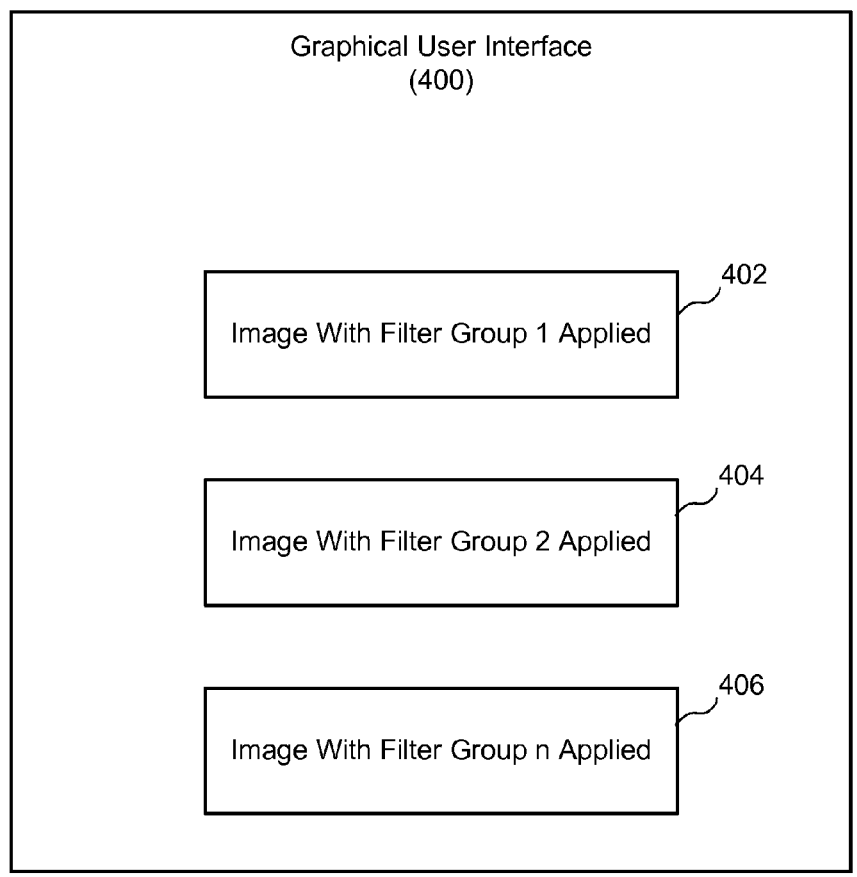
FIG. 4 is a diagram of an example graphical user interface in accordance with some implementations.

FIG. 4 is a diagram of an example graphical user interface 400 in accordance with some implementations. In particular, the user interface 400 includes three suggested images (402-406) each being a modified image based on a different filter group. The suggested images can be ranked based on a score from the classifier (e.g., 302).

The server (e.g., 102 and/or 200) can include, but is not limited to, a single processor system, a multi-processor system (co-located or distributed), a cloud computing system, or a combination of the above.

The processing device (e.g., 200) configured for image enhancement using learned non-photorealistic effects can include, but is not limited to, a desktop computer, a laptop computer, a portable computer, a tablet computing device, a smartphone, a feature phone, a personal digital assistant, a media player, an electronic book reader, an entertainment system of a vehicle or the like.

The user devices can be connected to an image processing system configured to perform image enhancement as described herein via a network. The network connecting user devices to an image processing system can be a wired or wireless network, and can include, but is not limited to, a WiFi network, a local area network, a wide area network, the Internet, or a combination of the above.

The data storage, memory and/or computer readable medium can be a magnetic storage device (hard disk drive or the like), optical storage device (CD, DVD or the like), electronic storage device (RAM, ROM, flash, or the like). The software instructions can also be contained in, and provided as, an electronic signal, for example in the form of software as a service (SaaS) delivered from a server (e.g., a distributed system and/or a cloud computing system).

Moreover, some implementations of the disclosed method, system, and computer readable media can be implemented in software (e.g., as a computer program product and/or computer readable media having stored instructions for performing notifications across different devices as described herein). The stored software instructions can be executed on a programmed general purpose computer, a special purpose computer, a microprocessor, or the like.

It is, therefore, apparent that there is provided, in accordance with the various example implementations disclosed herein, systems, methods and computer readable media for image enhancement using learned non-photorealistic effects.

While the disclosed subject matter has been described in conjunction with a number of implementations, it is evident that many alternatives, modifications and variations would be or are apparent to those of ordinary skill in the applicable arts. Accordingly, Applicants intend to embrace all such alternatives, modifications, equivalents and variations that are within the spirit and scope of the disclosed subject matter.

What is claimed is:

1. A method comprising:
   obtaining an original image associated with a first user of a social network;
   analyzing the original image to determine one or more image feature characteristics of the original image, the one or more image feature characteristics comprising a subject of the original image;
   selecting by a classifier a photorealistic filter and a non-photorealistic filter, wherein the selection of the photorealistic filter is based on a score that is determined by how the photorealistic filter can correct or enhance the one or more image feature characteristics of the original image and wherein selection of the non-photorealistic filter is based on another score that is determined by how the non-photorealistic filter can reduce one or more artifacts resulting from application of the selected photorealistic filter, and, wherein the classifier is trained with training data corresponding to images shared by other users of the social network connected to the first user via a social graph;
   applying the photorealistic filter to the original image to generate a first modified image and then applying the non-photorealistic filter to the first modified image to generate a second modified image; and
   causing the second modified image to be displayed.

2. A method comprising:
   obtaining an original image associated with a first user of a social network;
   analyzing the original image to determine one or more image feature characteristics of the original image, the one or more image feature characteristics comprising one or more of: one or more subjects of the original image, a histogram of the original image, noise of the original image, and focus of the original image;
   selecting by a classifier a photorealistic filter and a non-photorealistic filter, wherein the selection of the photorealistic filter is based on a score that is determined by how the photorealistic filter can correct or enhance the one or more image feature characteristics of the original image, wherein the selection of the non-photorealistic filter is based on another score that is determined by how the non-photorealistic filter can reduce one or more artifacts resulting from application of the selected photorealistic filter, and wherein the classifier is trained with training data corresponding to images shared by other users of the social network connected to the first user via a social graph;
   applying the photorealistic filter and the non-photorealistic filter to generate a modified image; and
   causing the modified image to be displayed.

3. The method of claim 2, wherein the applying includes applying the photorealistic filter followed by the non-photorealistic filter.

4. The method of claim 2, further comprising training the classifier by learning filters preferred by one or more users.

5. The method of claim 2, further comprising training the classifier using a positive training data set and a negative training data set.

6. The method of claim 2, further comprising presenting a plurality of groups of one or more filters, where the groups are ordered for presentation based on a score from the classifier.

7. The method of claim 2, further comprising suggesting one or more filters at a time the original image is obtained by an imaging device, wherein the one or more filters are selected for suggestion based on a classifier score of the original image.

8. The method of claim 2, wherein the classifier is also trained based on filters suggested by other users within the social graph of the first user.

9. The method of claim 2, wherein the classifier also is trained based on training data selected from images associated with the social graph of the first user.

10. The method of claim 2, wherein the one or more image feature characteristics includes a color histogram of the image.

11. A system having one or more computers configured to perform operations comprising:
obtaining an original image associated with a first user of a social network;
analyzing the original image to determine one or more image feature characteristics of the original image;
selecting by a classifier a first photorealistic filter based on the one or more image feature characteristics to correct or enhance the original image and selecting by the classifier a second non-photorealistic filter based on an output of the first photorealistic filter and a score indicating reduction by the second filter of one or more artifacts created by the first photorealistic filter, wherein the classifier is trained with training data corresponding to images shared by other users of the social network connected to the first user via a social graph;
applying the first photorealistic filter and the second non-photorealistic filter to generate a modified image; and
causing the modified image to be displayed.

12. The system of claim 11, wherein the applying includes applying the first photorealistic filter followed by the second non-photorealistic filter.

13. The system of claim 11, wherein the operations further comprise training the classifier by learning filters preferred by one or more users.

14. The system of claim 11, wherein the operations further comprise presenting a plurality of groups of one or more filters, where the groups are ordered for presentation based on a score from the classifier.

15. The system of claim 11, wherein the operations further comprise suggesting one or more filters at a time the original image is obtained by an imaging device, wherein the one or more filters are selected for suggestion based on a classifier score of the original image.

16. The system of claim 11 wherein the classifier is also trained based on filters suggested by other users within the social graph of the first user.

17. The system of claim 11, wherein the classifier also is trained based on training data selected from images associated with the social graph of the first user.

18. The system of claim 11, wherein the one or more image feature characteristics includes one or more subjects of the image.

19. The system of claim 11, wherein the one or more image feature characteristics includes a color histogram of the image.

20. The system of claim 11, wherein the one or more image feature characteristics includes a focus of the image.

* * * * *